(12) United States Patent
Shang et al.

(10) Patent No.: US 10,028,021 B2
(45) Date of Patent: Jul. 17, 2018

(54) METHOD AND DEVICE FOR ENCODING A CAPTURED SCREENSHOT AND CONTROLLING PROGRAM CONTENT SWITCHING BASED ON THE CAPTURED SCREENSHOT

(71) Applicants: Hisense Electric Co., Ltd., Qingdao, Shandong (CN); Hisense USA Corp., Suwanee, GA (US); Hisense International Co., Ltd., Qingdao, Shandong (CN)

(72) Inventors: Xiuyuan Shang, Suwanee, GA (US); Ke Yu, Alpharetta, GA (US)

(73) Assignees: Hisense Electric Co., Ltd., Qingdao, Shandong (CN); Hisense USA Corp., Suwanee, GA (US); Hisense International Co., Ltd., Qingdao, Shandong (CN)

(*) Notice: Subject to any disclaimer, the term of this patent is extended or adjusted under 35 U.S.C. 154(b) by 679 days.

(21) Appl. No.: 14/579,309

(22) Filed: Dec. 22, 2014

(65) Prior Publication Data
US 2016/0182948 A1    Jun. 23, 2016

(51) Int. Cl.
*G06F 3/00* (2006.01)
*H04N 21/4402* (2011.01)
*H04N 21/482* (2011.01)
*H04N 21/472* (2011.01)
*H04N 21/8543* (2011.01)
(Continued)

(52) U.S. Cl.
CPC ....... *H04N 21/440245* (2013.01); *H04N 1/00* (2013.01); *H04N 21/433* (2013.01); *H04N 21/4345* (2013.01); *H04N 21/4383* (2013.01); *H04N 21/47202* (2013.01); *H04N 21/482* (2013.01); *H04N 21/64322* (2013.01); *H04N 21/8133* (2013.01); *H04N 21/8153* (2013.01);
(Continued)

(58) Field of Classification Search
CPC ............ H04N 21/440245; H04N 1/00; H04N 21/433; H04N 21/4345
See application file for complete search history.

(56) References Cited

U.S. PATENT DOCUMENTS

| | | | |
|---|---|---|---|
| 2009/0092953 A1* | 4/2009 | Yang | G09B 19/24 434/219 |
| 2012/0010995 A1* | 1/2012 | Skirpa | G06F 3/0481 705/14.49 |

(Continued)

*Primary Examiner* — Nicholas Augustine
(74) *Attorney, Agent, or Firm* — Brinks Gilson & Lione

(57) ABSTRACT

A method and device for encoding a captured screenshot and controlling program switching on an electronic device based on the captured screenshot. The method includes the electronic device performing: capturing from a display a screenshot of a playing program or display content with a stored image data frame; encoding the image data frame of the screenshot, afterwards storing the encoded image data frame of the screenshot; retrieving program information data of the screenshot from a program database; embedding retrieved program information data of the captured screenshot into the encoded image data frame to form an embedded encoded image file. The embedded encoded image file enables the first electronic device or a second electronic device to directly switching to start playing the program or displaying the content on the electronic device according to the captured screenshot.

19 Claims, 3 Drawing Sheets

(51) Int. Cl.
  *H04N 21/858*  (2011.01)
  *H04N 21/643*  (2011.01)
  *H04N 21/433*  (2011.01)
  *H04N 21/438*  (2011.01)
  *H04N 21/434*  (2011.01)
  *H04N 1/00*  (2006.01)
  *H04N 21/81*  (2011.01)
  *G06F 3/01*  (2006.01)

(52) U.S. Cl.
  CPC ..... *H04N 21/8543* (2013.01); *H04N 21/8586* (2013.01)

(56) References Cited

U.S. PATENT DOCUMENTS

2012/0304224 A1\* 11/2012 Hines ............... H04N 21/44008
                       725/34
2016/0335500 A1\* 11/2016 Popelo .................... G06T 11/60

\* cited by examiner

METHOD AND DEVICE FOR ENCODING A CAPTURED SCREENSHOT AND CONTROLLING PROGRAM CONTENT SWITCHING BASED ON THE CAPTURED SCREENSHOT

CROSS-REFERENCE TO RELATED APPLICATIONS

Field of the Technology

The present disclosure relates to the field of Television (TV) technologies, particularly to method and device for encoding a captured screenshot and controlling program content switching based on the captured screenshot.

BACKGROUND

Internet Protocol Television (IPTV) is a new technology implemented in a Television (TV) which utilizes a broadband wired network which integrates the Internet, multimedia and communication technology, providing home users with diverse interactive services such as digital video services. IPTV (also known as smart TV) enables a user to share a favorite TV channel program, a Video on demand (VOD) program, an on-line movie or video clips (i.e., the playing program) of what the user is watching with another user.

SUMMARY

The embodiments of the present disclosure provide a method and an electronic device for encoding a captured screenshot and controlling program content switching based on the captured screenshot.

A first aspect of the embodiments of the present disclosure provides a method for encoding a captured screenshot. The method includes at least the operations of: capturing from a display of a first electronic device, a screenshot of a playing program or display content, wherein the screenshot comprises stored image data frame; encoding by the first electronic device, the image data frame of the screenshot, afterwards storing the encoded image data frame of the screenshot (i.e., in one of: a local memory of the first electronic device or a remote memory accessible through a network connection); retrieving by the first electronic device, program information data of the screenshot of the playing program or display content from a program database accessible through one of: from a local database in the first electronic device or from a remote server/database through the network connection; embedding by the first electronic device, retrieved program information data of the captured screenshot into the encoded image data frame to form an embedded encoded image file.

A second aspect of the embodiments of the present disclosure provides a method for controlling switching to play program or display content on an electronic device. The method includes at least the operations of: obtaining an embedded encoded image; extracting program information data from the embedded encoded image; switching to play the program or display the content in the electronic device according to the extracted program information data.

A third aspect of the embodiments of the present disclosure provides an electronic device for controlling program to start playing program or display content, wherein the electronic device includes: one or more processors; and a memory, wherein: the memory stores one or more computer-readable instruction codes, wherein the computer-readable instruction codes cause a plurality of respective hardware in the electronic device to perform respective controlling functions to perform: obtaining an embedded encoded image; extracting program information data from the embedded encoded image; and switching to play the program or display the content in the electronic device according to the extracted program information data.

The captured screenshot may be locally stored in the first electronic device for future retrieval to directly switch to start playing the program or displaying the content according to the captured screenshot. In another embodiment, the screenshot may be for sharing with a second electronic device through uploading the screenshot to a network connection, such that the embedded encoded image file may enable the second electronic device to directly switching to start playing the program or displaying the content according to the captured screenshot of the first electronic device. The network connection may include anyone of: Bluetooth® connection, ZigBee connection, Local Area Network (LAN) connection, WiFi connection and Internet connection, or through uploading to a social network website.

BRIEF DESCRIPTION OF THE DRAWINGS

The accompanying drawings may be included to provide further understanding of the claims and disclosure which may be incorporated in, and constitute an area of this specification. The detailed description and illustrated embodiments described may serve to explain the principles defined by the claims.

DETAILED DESCRIPTION OF ILLUSTRATED EMBODIMENTS

The various embodiments of the disclosure may be further described in details in combination with attached drawings and embodiments below. It should be understood that the specific embodiments described here may be used only to explain the disclosure, and may not be configured to limit the disclosure. In addition, for the sake of keeping description brief and concise, the newly added features, or features which may be different from those previously described in each new embodiment may be described in details. Similar features may be referenced back to the prior descriptions in a prior numbered drawing or referenced ahead to a higher numbered drawing. Unless otherwise specified, all technical and scientific terms herein may have the same meanings as understood by a person skilled in the art.

For the sake of consistency throughout the description, the electronic device which captures a screenshot is identified as a "first electronic device", and the electronic device which obtains the captured screenshot from another electronic device is identified as a "second electronic device". If no prefix is used, the term "device" or "electronic device" may equally be referred to one or both of the "first electronic device" and the "second electronic device". In addition, the term "an electronic device" and "another electronic device" may sometimes be used to distinguish between two different electronic devices.

Figure 1:
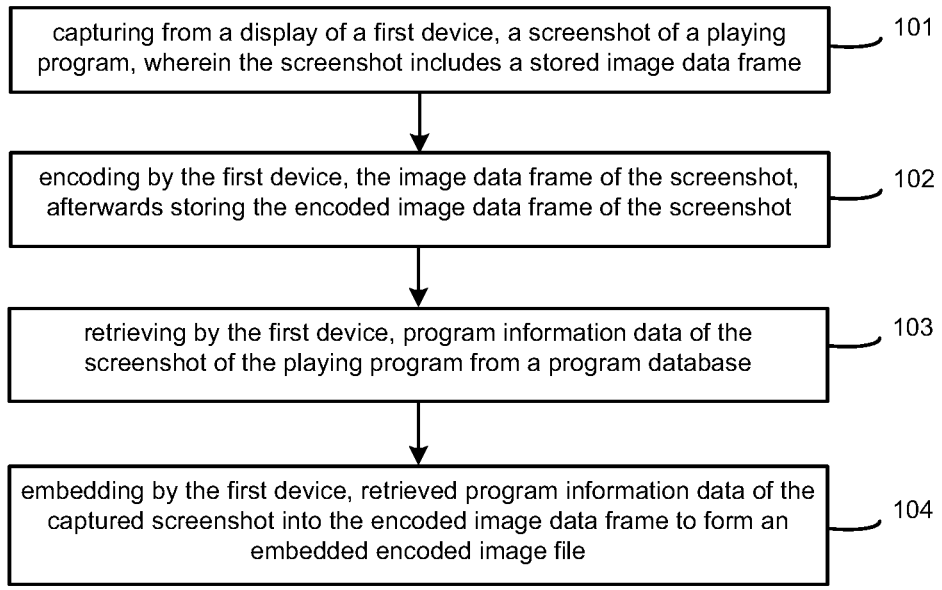
FIG. 1 shows a flowchart of an exemplary method for encoding a captured screenshot, according to an embodiment of the present disclosure.
Figure 2:
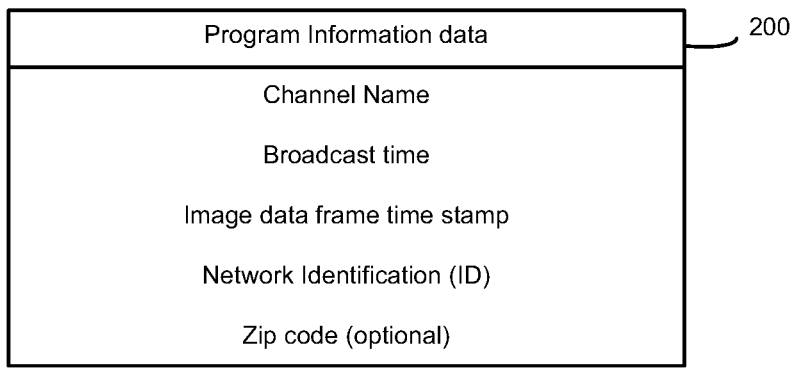
FIG. 2 shows an exemplary program information data structure, according to an embodiment of the present disclosure.
Figure 3:
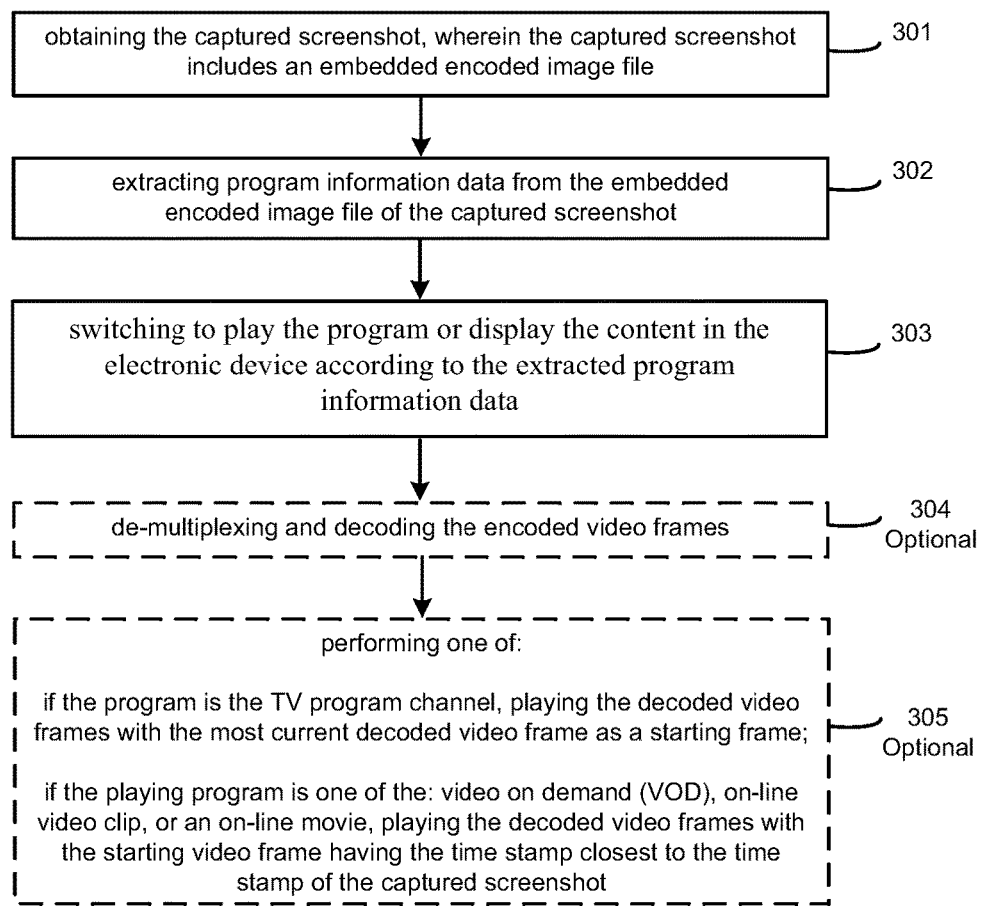
FIG. 3 shows a flowchart of an exemplary method controlling to play program or display content on an electronic device based on a captured screenshot, according to an embodiment of the present disclosure.

FIGS. 1 to 3 may be utilized in conjunction to illustrate the embodiments in the methods. FIG. 1 shows a flowchart of an exemplary method (through executing program viewing software or firmware) for encoding a captured screenshot, according to an embodiment of the present disclosure. The method may include at least the following operations.

Operation 101: capturing from a display of a first electronic device, a screenshot of a playing program or display content, wherein the screenshot may include a stored image data frame.

In actual implementation, the first electronic device may include one of: an Internet Protocol TV (IPTV), a smart phone, a laptop computer, an electronic tablet device, a desk top computer, or any device which has network connection capability to receive program channels, and can perform screenshot capturing function. In an embodiment, the image data frame may be stored in the first electronic device in a local frame buffer of the first electronic device, or remote from the first electronic device. The image frame format may be in a Joint Photographic Experts Group (JPEG) file format. In addition, the playing program or display content on the first electronic device may from one of: a TV program channel, a video on demand (VOD) program (such as a pay per view recorded boxing event), an on-line video clip (such as a You-Tube video clip) or an on-line movie (such as from a free movie web site).

Operation 102: encoding by the first electronic device, the image data frame of the screenshot, afterwards storing the encoded image data frame of the screenshot.

In actual implementation, the encoded image data frame of the screenshot may be stored in one of: a local memory of the first electronic device or a remote memory accessible through a network connection. In actual implementation, the encoded image data frame is preferably in Joint Photographic Experts Group (JPEG) file format, which provides a better compression rate for TV program screenshots. In theory, all image formats (besides JPEG) that provide a way to store the image data may also be used in the embodiments of the disclosure also.

Operation 103: retrieving by the first electronic device, program information data of the screenshot of the playing program from a program database. In actual implementation, the program data base is accessible through one of: from a local database in the first electronic device or from a remote server/database through a network connection. More specifically, the program database may be a Program and System Information Protocol (PSIP) database.

The PSIP is defined by General Instrument for the DigiCipher 2 system and later extended for the Advanced Television Systems Committee (ATSC) Standard digital television system for carrying metadata about each channel in the broadcast MPEG transport stream of a television station and for publishing information about television programs so that viewers may select what to watch by title and description. In addition, PSIP defines virtual channels and content ratings, as well as electronic program guides with titles and optionally description to be decoded and to be displayed by High Definition TV (HDTV) tuners. The HDTV tuners may be integrated into a TV set (such as the TV), VCR digital video recorder (DVR), or set top box (STB). Furthermore, the PSIP may also send information such as the exact time (e.g., time stamp information) referenced to UTC and GPS time.

The reader is referred to FIG. 2, which shows an exemplary program information data structure (200) obtained from the PSIP database. For example, the program information data structure (200) may include at least the following program information data: program name, channel name (optional), time in program, network identity (network ID) (optional) and zip code (optional). The "program name" may be a name of the show or the video clip which may be used by the second electronic device for searching the playing program, once an image of the captured screenshot is received. The "channel name", "network ID" and "zip code" are optional information which may provide a higher accuracy in the search by the second electronic device. The "time in program" is a time stamp which indicates the time instant when the screenshot is captured by the first electronic device. The time stamp information helps establish the location (in time) of the very image frame captured by the first electronic device which may be played as a starting frame in the VOD program or on-line movie for video streaming purpose.

The following example may illustrate some of the program information data retrieved from a PSIP database:

| Type | Sample |
| --- | --- |
| Program name | Fringe |
| Channel name | WPXA-TV |
| Channel # | 14.1 |

The above program information data may be encoded into a JavaScript Object Notation (JSON) string, such as below:
{"program_name":"Fringe","channel_name":"WPXA-TV","channel_number":"14.1"}

The JSON string is an open standard encoding format that uses human-readable text to transmit data objects consisting of attribute—value pairs. It is used primarily to transmit data between a server and web application, as an alternative to XML.

Operation 104: embedding by the first electronic device, retrieved program information data of the captured screenshot to form an embedded encoded image file.

In actual implementation, the encoded image data frame comprises Exchangeable Image File (EXIF) data. The EXIF data format is not limiting, other data format for embedding are also feasible. Operation 104 may include the first electronic device embedding the retrieved program information data of the captured screenshot into the encoded image data frame's Exchangeable Image File (EXIF) data to form the embedded encoded image file. When embedding the program information data (which is JSON encoded) into the encoded image file's EXIF data, an EXIF Makerdata tag is generated as an embedded encoded image, which may be illustrated as follows:

| JPEG/Exif |
| --- |
| SOI: Start of Image (OxFF, OxD8) |
| APP 0 Section |
| APP 1 Section |
| APP 2 Section |
| . . . |
| APP n Section |

-continued

JPEG/Exif

...
DQT: Quantization Table
DHT: Huffman Table
(DRI: Optional Restart Intervals)
SOF: Frame Header
SOS: Scan Header
Compressed Data
EOI: End of Image (0xFF, 0xD9)

The EXIF data are descriptive metadata pertaining to the image data frame of the screenshot, which may include at least at least three or more of: EXIF tag values, date and time information, camera settings, thumbnail for previewing the picture on the TV screen, recording media format, copyright information, geolocation, supporting software libraries and application software which handles the EXIF data.

In an embodiment of the disclosure, the embedded encoded image file enables the first electronic device or a second electronic device to directly switching to start playing the program or displaying the content according to the captured screenshot. The captured screenshot may be locally stored in the first electronic device for later retrieval to directly switch to the playing program channel, or instantly switching to a VOD program based on the stored captured screenshot.

In another implementation, the stored captured screenshot (i.e., the embedded encoded image file) in the first electronic device may later be sent through the network connection to share with a second electronic device to enable the second electronic device to directly switching to start playing the program or displaying the content according to the captured screenshot. Alternately, the screenshot sharing is not limiting. For example, the screenshot may be shared through other methods, such as through a removable USB memory stick, or other file transfer methods known by the ordinary skill in the art.

The network connection may be anyone of: Bluetooth® connection, Near Field (NF) ZigBee connection, Local Area Network (LAN) connection, WiFi connection and Internet connection. Direct sharing may be performed through transferring of the captured screenshot to the second electronic device through one of the above listed network connections. Alternately, the first electronic device may upload the captured screenshot through one of the network connections to a social network (e.g., Facebook, Twitter, WeChat, etc.,) for sharing the captured screenshot with friends.

FIG. 3 shows a flowchart of an exemplary method controlling to play program or display content on an electronic device based on a captured screenshot, according to an embodiment of the present disclosure. The electronic device may be referred to being one or both of a first electronic device (which captures the screenshot) and a second electronic device (which obtains a shared screenshot from another electronic device, such as through the network connection). The method may include at least the following operations.

Operation 301: obtaining the captured screenshot, wherein the captured screenshot comprises an embedded encoded image. By clicking on the captured screenshot, an embedded encoded image file of the captured screenshot may be opened in the electronic device.

In an embodiment, a user of a first electronic device may retrieve a captured screenshot which is locally stored in the first electronic device. In another embodiment a user of a second electronic device may obtain the captured screenshot through a removable memory media such as a USB memory stick or memory storage media. Yet in another embodiment, the screenshot may be obtained through a network connection (i.e., anyone of: Bluetooth® connection, ZigBee connection, Local Area Network (LAN) connection, WiFi connection and Internet connection). For example, the user of the second electronic device while browsing his or her social network website may obtain the captured screen shot shared by the user of the first electronic device (who may be a friend of the user of the second electronic device).

Operation 302: extracting the program information from the embedded encoded image. In actual implementation, the embedded encoded image data frame may include Exchangeable Image File (EXIF) data. The EXIF data are descriptive metadata pertaining to the image data frame of the screenshot, which may include at least at least three or more of: EXIF tag values, date and time information, camera settings, thumbnail for previewing a picture on a TV screen, recording media format, copyright information, geolocation, supporting software libraries and application software which handles the EXIF data.

After extracting the program information data, the electronic device (through executing TV software, program channel software or firmware) may read the encoded image file, and extract the program information (from the EXIF data) in the embedded encoded data.

Operation 303: according to the extracted program information (from the EXIF data), the electronic device may play the program or display the content in the electronic device according to the extracted program information data of the captured screenshot.

In actual implementation, according to the extracted program information data the electronic device may perform one of: if the playing program is a TV program, searching for the TV program from a PSIP database and tuning the electronic device to a corresponding TV network channel frequency to retrieve encoded video frames of the playing program and locate a most current video frame on the playing program, or if the playing program is one of: a video on demand (VOD), an on-line video clips, or an on-line movie, searching through the network connection for a corresponding Uniform Resource Locator (URL) web address, and utilizing time stamp information in the program information data to retrieve encoded video frames of the playing program and locate a starting video frame with a time stamp closest to a time stamp of the captured screenshot, wherein the retrieved encoded video frames are stored in a local memory of the electronic device.

If the playing program is a TV program from a TV station (such as CBS, NBC, ABC, CNN, FOX news, BBC, CCTV, etc.), the embedded program information data (i.e., program name, channel name (optional), time in program, network identity (network ID) (optional) and zip code (optional)) from the PSIP data base may be utilized by the second electronic device to perform searches for a target TV program channel, and utilizing a tuner (such as tuner (415)) on the electronic device to tune (i.e., switching) to the target TV program channel (i.e., frequency channel) and starts streaming the encoded video frames starting with the most current video frame on the playing program.

Alternately, if the playing program is one of: a video on demand (VOD), an on-line video clips, or an on-line movie, the embedded program information data (i.e., program name, channel name (optional), time in program, network identity (network ID) (optional) and zip code (optional)) from the PSIP data base may be utilized by the electronic device to perform searches for a corresponding Uniform Resource Locator (URL) web address, and to retrieve encoded video frames of the playing program and locate a starting video frame with a time stamp closest to a time stamp of the captured screenshot.

The encoded video frames of the VOD program may be retrieved from a program provider (480) such as a cable or dish network service provider company (such as Comcast, Dish Network, etc.), or an on-line movie service provider (such as Amazon, Hulu, Netflix, etc.), and are stored into a local memory (such as memory (440)) (see FIG. 4) of the electronic device.

The method for controlling switching to play the program or displaying the content may further include the following additional operations:

Operation 304: de-multiplexing and decoding the encoded video frames. The retrieved encoded video frames (either from the tuner (415) or stored in the memory (440)) are de-multiplexed to select particular packets for further decrypting and are being forwarded for decoding. The decoded video frames may be stored in a local frame buffer (412) of the electronic device.

Operation 305: the second electronic device performing one of: if the playing program is a TV program, playing the decoded video frames with the most current decoded video frame as a starting frame; if the playing program is one of the: video on demand (VOD), on-line video clips, or on-line movie, playing the decoded video frames with a starting frame having a time stamp closest to the time stamp of the captured screenshot.

In actual implementation, if the playing program is a TV program (i.e., live broadcast), the second electronic device is instantly switched to the TV program channel according to the captured screen shot and play the most current decoded video frame (of the live broadcast) as a starting frame. If the playing program is one of the: video on demand (VOD), on-line video clips, or on-line movie, the second electronic device is instantly switched to the playing program and start playing the decoded video frames with a starting frame having a time stamp closest to the time stamp of the captured screenshot (by the first electronic device).

Figure 4:
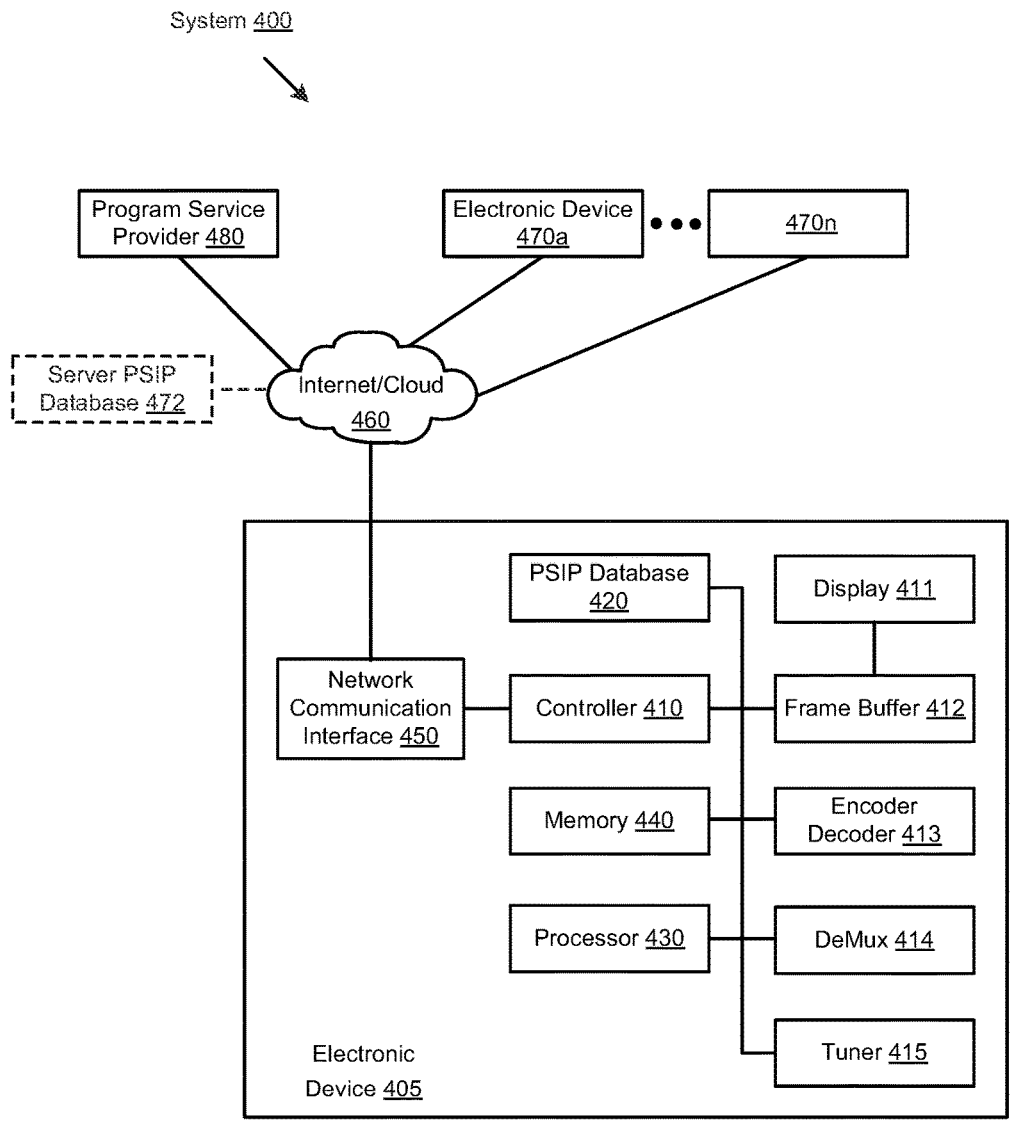
FIG. 4 shows an exemplary electronic device structural diagram and a system diagram, for capturing a screenshot and for controlling switching to play program or display content on an electronic device according to the captured screenshot, according to an embodiment of the present disclosure.

FIG. 4 shows an exemplary electronic device structural diagram and a system diagram (400), for capturing a screenshot and for controlling switching to play program or display content on an electronic device according to the captured screenshot, according to an embodiment of the present disclosure. The exemplary electronic device structural diagram may either be a first electronic device (405) or a second electronic device (anyone of 470a-470n). The electronic device may be a smart TV, such as an Internet Protocol TV (IPTV), a smart phone, a laptop computer, an electronic tablet device, or a desk top computer, or any device which has network connection capability to receive program channels and has screenshot capturing functionality.

The system (400) may include a first electronic device (405) and one or more second electronic device (470a to 470b) being connected to each other through a network connection (460) with cloud resources (e.g., server, memory, database, application programs, to name a few). The system (400) may also include a program service provider (480) which may be a TV station (such as CBS, NBC, ABC, CNN, FOX news, BBC, CCTV, etc.), a cable or dish network service provider company (such as Comcast, DishNetwork, etc.) which provides VOD programs, or an on-line movie service In an embodiment, the first electronic device (405) (as well as the second electronic device (anyone of 470a to 470n)) may include at least a processor (430) executing instruction codes (i.e., TV software, program channel software or firmware) stored in a respective non-transitory computer-readable medium memory (440), wherein the executed instruction codes cause a plurality of respective hardware in the first electronic device (405) (as well as the second electronic device) to perform respective controlling functions. The plurality of respective hardware in the first electronic device (405) (as well as the second electronic device) may include at least the following:

A controller (410) of the first electronic device (405) may capture from a display (411) of the first electronic device (405), a screenshot of a playing program, wherein the screenshot includes a stored image data frame. The image data frame may be stored in the first electronic device (405) in a local frame buffer, or stored in a memory remote from the first electronic device.

An encoder (413) which may encode the image data frame of the captured screenshot, afterwards storing the encoded image data frame of the screenshot. In actual implementation, the encoded image data frame may be stored in one of: a local memory (440) of the first electronic device (405) or a remote memory stored on a cloud resource accessible through the network connection (460).

The controller (410) may further perform: retrieve program information data of the captured screenshot of the playing program from a program database. In actual implementation, the program database may be accessible through one of from a local database (such as PSIP database 420) in the TV or from a remote server/database (such as server/PSIP database (472)) through a network connection (460). The first controller (410) may embed retrieved program information data of the captured screenshot into the encoded image data frame (which may be an Exchangeable Image File (EXIT) data) to form an embedded encoded image file.

The embedded encoded image file of the captured screenshot may enable the first controller (410) to directly switch the first electronic device to start playing the program or displaying the content according to the captured screenshot. In an implementation of the disclosure, the captured screenshot may be locally stored in the first electronic device (405) for later retrieval to directly switch to the playing program channel, or instantly switching to a VOD program based on the stored captured screenshot.

A communication interface (450) may send the embedded encoded image file of the captured screenshot through the network connection (460) to share with another user of the second electronic device (anyone of 470a to 470n), such that the embedded encoded image file may enable the second electronic device (anyone of 470a to 470n) to directly switch to start playing the program or displaying the content according to the captured screenshot of the first electronic device.

In an implementation of the disclosure, the captured screenshot may directly be sent through the network connection (460) to be shared with a second electronic device (anyone of 470a-470n). In another implementation of the disclosure, the stored captured screenshot in the first electronic device (405) may later be retrieved and sent through the network connection (460) to be shared with a second electronic device (anyone of 470a-470n). The embedded encoded image file of the captured screenshot may enable the second electronic device to directly switching to start playing the program or displaying the content according to the captured screenshot.

The network connection may be anyone of: Bluetooth® connection, Near Field, ZigBee connection, Local Area Network (LAN) connection, WiFi connection and Internet connection. Direct sharing may be performed through transferring of the captured screenshot to the second electronic device through one of the above listed network connections. Alternately, the first electronic device may upload the captured screenshot through one of the network connections to a social network (e.g., Facebook, Twitter, WeChat, etc.,) for sharing the captured screenshot with friends.

Alternately, the screenshot sharing is not limiting. For example, the screenshot may be shared through other methods, such as through a removable USB memory stick, or other file transfer methods known by the ordinary skill in the art.

The playing program or display content may be one of: a TV program channel, a video on demand (VOD) program, an on-line video clip or an on-line movie. The program information data of the screenshot obtained from the PSIP database may have a data structure (200) (see FIG. 2) which may include at least the following data: program name, channel name (optional), time in program, network identity (network ID) (optional) and zip code (optional).

In actual implementation, the encoded image data frame may preferably be in Joint Photographic Experts Group (JPEG) file format, which provides a better compression rate for TV program screenshots. In theory, all image formats (besides JPEG) that provide a way to store the image data may be used in the embodiments of the disclosure also.

The embedded encoded image data frame may include Exchangeable Image File (EXIF) data. The EXIF data are descriptive metadata pertaining to the image data frame of the screenshot, which comprises at least at least three or more of: EXIF tag values, date and time information, camera settings, thumbnail for previewing the picture on the TV screen, recording media format, copyright information, geolocation, supporting software libraries and application software which handles the EXIF data. Other data format other than the EXIF data which are known by the ordinary skill in the art may also be implemented in the embodiments described here.

FIG. 4 also discloses a second electronic device (470s) which may include similar basic functional blocks as depicted in the first electronic device (405). The second electronic device therefore, may perform the operations as described in the first electronic device (405).

More specifically, the second electronic device (anyone of 470a to 470n) may be enabled to perform program switching based on a captured screenshot. The second electronic device may include at least one processor executing instruction codes stored in a non-transitory computer-readable medium memory, wherein the executed instruction codes cause a plurality of respective hardware in the electronic device to perform respective controlling functions. The second electronic device may include the following relevant hardware:

A communication interface (450) of the second electronic device (such as 470a) may obtain the embedded encoded image file of the screenshot through the network connection. For example, the second electronic device may pair with the first electronic device through a Bluetooth® connection to directly download or obtain the embedded encoded image file of the captured screenshot is directly transferred to the second electronic device. Alternately, the second electronic device (470a) may obtain the embedded encoded image file of the captured screenshot when a user of the second electronic device (470a) clicks on the captured screenshot on the social network website (e.g., Facebook, Twitter, WeChat, etc.,) posted by the user of the first electronic device (405).

A controller (410) of the second electronic device (470a) may extract the program information (from the EXIF data) in the embedded encoded data. If the playing program is a TV program channel, the second controller (410) may search for the TV program channel from a PSIP database (420) (or remotely from the server/PSIP database (472)), and tunes the second electronic device (470a) to a corresponding TV network channel frequency to retrieve encoded video frames of the playing program and locate a most current video frame on the TV program channel.

If the playing program is one of: a video on demand (VOD) program, an on-line video clip, or an on-line movie, the second controller (410) may search for the TV program channel from a PSIP database (420) (or remotely from the server/PSIP database (472)) through the network connection (460) for a corresponding Uniform Resource Locator (URL) web address. The second controller (410) of the second electronic device (470a) may utilize time stamp information in the program information extracted from the EXIF data to retrieve encoded video frames of the playing program and locate a starting video frame with a time stamp closest to a time stamp of the captured screenshot by the first electronic device (405). The retrieved encoded video frames of the VOD program may be stored into a second memory (440).

A de-multiplexer (414) of the second electronic device (470a) may de-multiplex from one of: the encoded video frames of the playing TV program channel which are received via the tuner (415), or the encoded video frames of the VOD program which are stored in the second memory (440) of the second electronic device (470a). The de-multiplexer (414) may select particular packets for from the encoded video frames for further decryption and forward them for decoding. The decoded video frames are stored in the frame buffer (412) and may be immediately played and displayed on a display (411) of the second electronic device (470a).

A decoder (413) of the second electronic device (470a) may decode the encoded video frames and store the decoded video frames in the second frame buffer (412). wherein: if the playing program is a TV program (i.e., live broadcast), the decoded video frames may be instantly played from the second frame buffer (412) and displayed to the display (411) with the most current decoded video frame as a starting frame of the TV program. If the playing program is one of the: video on demand (VOD), on-line video clips, or on-line movie, the decoded video frames may be instantly played from the second frame buffer (412) and displayed to the display (411) with the starting frame having a time stamp closest to the time stamp of the captured screenshot (by the first electronic device).

Implementing the above disclosed embodiments enable a user of the second electronic device (470a) to perform only a single click on the screenshot (on the social network) to directly switching to and start playing the program or displaying the content according to the captured screenshot of the first electronic device (405). If the playing program is a TV program channel, the user may simply perform a single click on the captured screenshot as shown on his or her social network webpage, which would directly tunes the second electronic device to the playing program channel without requiring the user to put any manual effort to separately tune to the TV program channel. If the captured screenshot pertains to a VOD program or an on-line movie, the user may simply perform a single click on the captured screenshot as shown on his or her social network webpage, the second electronic device (470a) would directly launch to the VOD program or on-line movie with a starting video frame having a time stamp closest to the time frame of the captured screenshot, thereby eliminating the manual multiple operations of tuning to the VOD program or the on-line movie, and manually seeking for the closest captured screenshot within the program; thus improving viewers' experience and reduce time delay.

In one embodiment of present disclosure, the program information data may not be embedded in an image which comes from a captured screenshot, but be embedded in an ordinary image which can be any other kinds of origination, such as posters or other images that a user likes.

The sequence numbers of the above-mentioned embodiments may be intended only for description, instead of indicating the relative merits of the embodiments. It should be understood by those with ordinary skill in the art that all or some of the operations of the foregoing embodiments may be implemented by at least a processor and relevant hardware in a TV, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive, ROM or flash memory. The computer-executable commands may control program switching on a Television based on a captured screenshot.

The invention claimed is:

1. A method for encoding a captured screenshot, comprising:
    capturing from a display screen of a first electronic device, a screenshot of a program content when being played, wherein the screenshot comprises an image data frame of a pixel content of the program content displayed on the display screen at a time of its capture;
    encoding by the first electronic device, the image data frame of the screenshot, and storing the encoded image data frame of the screenshot;
    retrieving by the first electronic device, program information data associated with the program content from a program database;
    embedding by the first electronic device, the retrieved program information data into the encoded image data frame of the screenshot to form an embedded encoded image file separate from the program content;
    enabling, by the first electronic device, a second electronic device to:
        extract the program information data from the embedded encoded image file;
        switch to play the program content in the second electronic device according to the extracted program information data.

2. The method according to claim 1, further comprising sharing, by the first electronic device, the embedded encoded image file through a network connection with the second electronic device.

3. The method according to claim 2, wherein the first or the second electronic device comprises one of: a smart TV, an Internet Protocol TV (IPTV), a smart phone, a laptop computer, an electronic tablet device, or a desk top computer.

4. The method according to claim 1, wherein the program content comprises one of: a program from a TV program channel, a video on demand (VOD) program, an on-line video clip or an on-line movie.

5. The method according to claim 1, wherein the program information data of the program content retrieved from the program database comprises at least two or more of: a program name, a channel name, a program broadcast time, an image data frame time stamp, a network identity (network ID) and a zip code.

6. The method according to claim 1, wherein the captured screenshot is stored locally in the first electronic device for retrieval to directly switch to start playing the program content according to the captured screenshot by the first electronic device.

7. The method according to claim 1, wherein the encoded image data frame comprises Exchangeable Image File (EXIF) data, wherein the EXIF data are descriptive metadata pertaining to the image data frame of the screenshot, which comprises at least three or more of: a EXIF tag values, a date and a time information, camera settings, a thumbnail image, recording media format, copyright information, a geolocation, supporting software libraries, and an application software which handles the EXIF data.

8. The method according to claim 1, wherein the program database is accessible through one of: from a local database in the first electronic device or from a remote server/database through a network connection, and the program database comprises a Program and System Information Protocol (PSIP) database and the program information data comprises one or more of: channel information and program guide information.

9. The method according to claim 2, wherein the network connection comprises anyone of: Bluetooth® connection, Near Field, ZigBee connection, Local Area Network (LAN) connection, and WiFi connection.

10. The method according to claim 2, wherein enabling the second electronic device to extract the program information data and switch to play the program content comprises enabling, by the first electronic device, the second electronic device to:
    obtain the embedded encoded image file;
    extract the program information data from the embedded encoded image file;
    according to the extracted program information data, performing one of:
        if the program content is a program from a TV program channel, searching for the TV program channel from a Program and System Information Protocol (PSIP) database and tuning the first or the second electronic device to a corresponding TV program channel frequency to retrieve encoded video frames of the program content and locate a most current video frame on the TV program channel, or
        if the program content is one of: a video on demand (VOD) program, an on-line video clip, or an on-line movie, searching through the network connection for a corresponding Uniform Resource Locator (URL) web address, and utilizing a time stamp information to retrieve encoded video frames of the program content and locate a starting video frame with a time stamp closest to a time stamp of the captured screenshot wherein the retrieved encoded video frames are stored in a local memory;
    decode the retrieved encoded video frames; and
    if the program content is the program from the TV program channel, play the decoded video frames with the most current decoded video frame as a starting frame;

if the program content is one of the: video on demand (VOD), on-line video clip, or an on-line movie, play the decoded video frames with the starting video frame having the time stamp closest to the time stamp of the captured screenshot.

11. A first electronic device for encoding a captured screenshot, comprising:
one or more first processors; and
a first memory, wherein:
the first memory stores one or more first computer-readable instruction codes, and wherein the first computer-readable instruction codes cause a plurality of respective hardware in the electronic device to perform respective controlling functions to perform:
capturing from a display screen of a first electronic device, a screenshot of a program content when being played, wherein the screenshot comprises an image data frame of a pixel content of the program content displayed on the display screen at a time of its capture;
encoding by the first electronic device, the image data frame of the screenshot, and storing the encoded image data frame of the screenshot;
retrieving by the first electronic device, program information data associated with the program content from a program database;
embedding by the first electronic device, the retrieved program information data into the encoded image data frame of the screenshot to form an embedded encoded image file separate from the program content;
enabling a second electronic device to:
obtain the embedded encoded image file;
extract the program information data from the embedded encoded image file; and
switch to play the program content in the electronic device according to the extracted program information data.

12. The first electronic device according to claim 11, wherein the first electronic device further comprises a first communication interface for sharing the embedded encoded image file with the second electronic device through a network connection.

13. The first electronic device according to claim 11, wherein the electronic device comprises one of: an Internet Protocol TV (IPTV), a smart phone, a laptop computer, an electronic tablet device, or a desk top computer.

14. The first electronic device according to claim 11, wherein the program or the content comprises one of: a program from a TV program channel, a video on demand (VOD) program, an on-line video clip or an on-line movie.

15. The first electronic device according to claim 11, wherein the program information data in the embedded encoded image file is retrieved from a Program and System Information Protocol (PSIP) database and comprises at least two or more of: a program name, a channel name, a program broadcast time, an image data frame time stamp, a network identity (network ID) and a zip code.

16. The first electronic device according to claim 11, wherein the embedded encoded image file is stored locally in the first electronic device for retrieval to directly switch to start to play the program content according to the extracted program information data by the first electronic device.

17. The first electronic device according to claim 11, wherein the embedded encoded image file comprises Exchangeable Image File (EXIF) data, wherein the EXIF data are descriptive metadata pertaining to the image data frame of the screenshot, and wherein the EXIF data comprises at least three or more of: a EXIF tag values, a date and time information, camera settings, a thumbnail, recording media format, copyright information, a geolocation, supporting software libraries and an application software which handles the EXIF data.

18. The first electronic device according to claim 12, wherein the network connection comprises anyone of: a Bluetooth® connection, a Near Field, a ZigBee connection, a Local Area Network (LAN) connection, and a WiFi connection.

19. The first electronic device according to claim 12, wherein enabling the second electronic device to extract the program information data and switch to play the program content by the first electronic device comprises enabling the second electronic device to:
obtain the embedded encoded image file;
extract the program information data from the embedded encoded image file;
according to the extracted program information data, performing one of:
if the program content is a program from a TV program channel, searching for the TV program channel from a Program and System Information Protocol (PSIP) database and tuning the first or the second electronic device to a corresponding TV program channel frequency to retrieve encoded video frames of the program content and locate a most current video frame on the TV program channel, or
if the program content is one of: a video on demand (VOD) program, an on-line video clip, or an on-line movie, searching through the network connection for a corresponding Uniform Resource Locator (URL) web address, and utilizing a time stamp information to retrieve encoded video frames of the program content and locate a starting video frame with a time stamp closest to a time stamp of the captured screenshot wherein the retrieved encoded video frames are stored in a local memory;
decode the retrieved encoded video frames; and
if the program content is the program from the TV program channel, play the decoded video frames with the most current decoded video frame as a starting frame;
if the program content is one of the: video on demand (VOD), on-line video clip, or an on-line movie, play the decoded video frames with the starting video frame having the time stamp closest to the time stamp of the captured screenshot.

* * * * *